(12) United States Patent
Myers, II

(10) Patent No.: US 6,237,259 B1
(45) Date of Patent: May 29, 2001

(54) SHELLFISH DREDGING APPARATUS

(76) Inventor: Arthur R. Myers, II, 2637 Pamlico Loop, Virginia Beach, VA (US) 23456

( * ) Notice: Subject to any disclaimer, the term of this patent is extended or adjusted under 35 U.S.C. 154(b) by 0 days.

(21) Appl. No.: 09/447,713

(22) Filed: Nov. 23, 1999

(51) Int. Cl.[7] ............................. B63C 11/52; A01K 73/00
(52) U.S. Cl. ................................................. 37/315
(58) Field of Search ........................... 37/314, 315, 316, 37/317, 318, 319; 209/311, 313, 353, 354

(56) References Cited

U.S. PATENT DOCUMENTS

| | | |
|---|---|---|
| 1,097,722 | 5/1914 | Lake . |
| 1,424,451 * | 8/1922 | Crandall . |
| 2,508,087 | 5/1950 | Bailey . |
| 2,674,549 * | 7/1954 | Olden . |
| 3,184,866 | 5/1965 | McMillin . |
| 3,226,854 | 1/1966 | Mero . |
| 3,310,894 | 3/1967 | Ball . |
| 3,367,048 * | 2/1968 | Doughty . |
| 3,462,858 | 8/1969 | Francklyn . |
| 3,521,386 | 7/1970 | Francklyn . |
| 3,624,932 | 12/1971 | Doyle . |
| 3,862,502 * | 1/1975 | Young . |
| 3,973,575 * | 8/1976 | Sullivan et al. . |
| 4,070,061 | 1/1978 | Obolensky . |
| 4,425,723 | 1/1984 | Erlandsen . |
| 4,464,851 | 8/1984 | Collier . |
| 4,681,372 * | 7/1987 | McClure . |
| 4,827,635 | 5/1989 | Erlandsen . |

FOREIGN PATENT DOCUMENTS

| | | |
|---|---|---|
| 1156547 | 6/1969 | (GB) . |

* cited by examiner

*Primary Examiner*—H. Shackelford
(74) *Attorney, Agent, or Firm*—Bacon & Thomas, PLLC

(57) ABSTRACT

An apparatus for dredging shellfish includes a digging jet connected to a source of pressurized water for liquifying sediment and directing the sediment and any shellfish in the sediment toward a digging blade and separating device, the separating device being arranged to separate out sediments, shellfish, and debris having a dimension smaller than a minimum dimension, and a suction chamber arranged to collect shellfish that has passed the separating device for conveyance to the surface. Between the separating device and suction chamber is a second separating device in the form of a plate having a plurality of openings for further separating shellfish from debris and clumps of sediment having a dimension larger than a maximum dimension of the shellfish to be collected. The shellfish are conveyed to the surface by a Venturi tube connected to the pressurized water source in such a manner that water from the pressurized water source is directed into the tube away from the suction chamber so as to siphon water from the suction chamber in the direction of the surface, and thereby carry shellfish in the chamber to the surface.

15 Claims, 5 Drawing Sheets

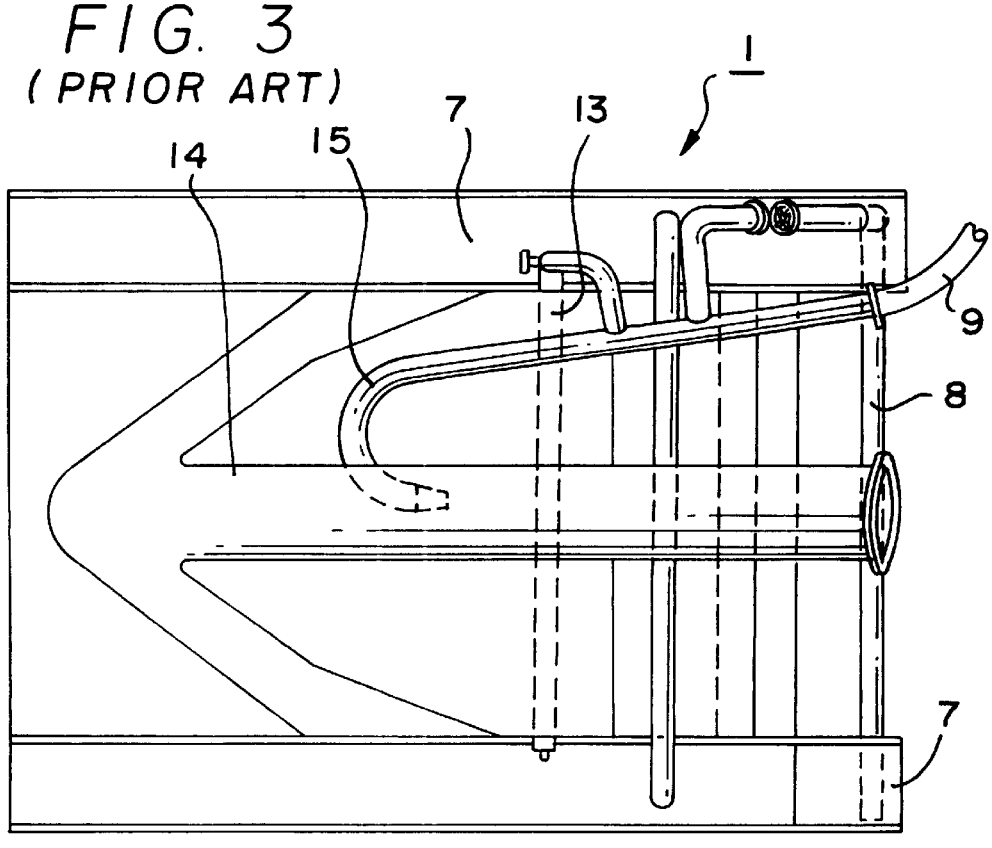

SHELLFISH DREDGING APPARATUS

BACKGROUND OF THE INVENTION

1. Field of the Invention

This invention relates to dredges, and in particular to a dredging apparatus for extracting bottom-dwelling shellfish such as clams, oysters, mussels, cockles, and crabs from a sea, lake, or riverbed and continuously transporting the extracted shellfish to a vessel towing the dredging apparatus.

2. Description of Related Art (i) Introduction

Numerous attempts have been made to devise mechanical harvesters that move or that can be towed along the bottom of a body of water in order to harvest shellfish that live in colonies at the bottom. All of these devices seek to dredge shellfish such as clams, oysters, cockles, mussels, and/or crabs from the bottom of the body of water and either trap the shellfish for retrieval after the device is brought to the surface, or continuously transport the shellfish to the surface as the dredge is being towed along the bottom.

Common problems that the designers of these devices have attempted to solve include problems of efficiency, i.e., the relationship between power or effort expended and the amount of shellfish harvested, problems related to the cost and reliability of the device, which are often a function of complexity, and problems related to environmental damage caused by the device as it is towed across the sea, lake, or riverbed.

(ii) Mechanical and Hydraulic Dredges

The earliest attempts at large-scale shellfish harvesting devices undoubtedly date back to prehistoric times and most likely involved diggers or tongs dragged along the bottom for scooping shellfish into a collection cage or basket that could then be brought to the surface and emptied. More sophisticated but nevertheless fundamentally similar examples of dredges of this type are still being used and are disclosed, for example, in U.S. Pat. Nos. 4,827,635, 4,425, 723, and 3,226,854. Such dredges have the advantage of simplicity, but are relatively inefficient because of inherent limitations in the effective of such mechanical dredging devices, and the need to repeatedly bring the dredges to the surface to be emptied.

As early as Greek times, use was being made of hydraulic device to harvest shellfish by using high pressure jets of water to slice a horizontal layer of sediment, followed by sifting of the loosened or liquified mass of shellfish-containing sediments to separate the shellfish from the sediments, and collection of the separate shellfish in a collection cage or basket. Such harvesters, which are also still in use, have the advantage of being able to dredge a relatively large area in less time than a purely mechanical harvester although they still require the collection cage or basket to be periodically brought to the surface for emptying.

(iii) Dredaes with Transport to the Surface

In order to avoid the need to periodically bring the dredge to the surface for removal of harvested shellfish, it has also been proposed to add conveyors that continously and automatically convey recovered shellfish to the surface, either in connection with a purely mechanical harvester or with one that uses a hydraulic digging action.

These conveyors can be either mechanical, hydraulic, or pneumatic, with mechanical conveyance systems being the most difficult to implement and as result, largely impractical. An example of a non-hydraulic dredge with a mechanical conveyor is nevertheless disclosed in U.S. Pat. No. 4,464, 851, while U.S. Pat. Nos. 2,508,087, 3,462,858, and 3,521, 386, disclose hydraulic dredges with mechanical conveyors in the form of conveyor belts or escalators.

In order to avoid the complexity of mechanical conveyance systems, it has been proposed to use a siphon effect to lift water in which shellfish have been entrained to the surface. Background examples of hydraulic shellfish transport arrangements are disclosed, for example, in U.S. Pat. Nos. 3,184,866 and 3,624,932.

U.S. Pat. No. 3,624,932 is of particular interest because it discloses an arrangement in which, like that of the present invention, a jet of water is directed across a layer of sediment to propel the sediment together with any shellfish onto a separating platform consisting of parallel blades that break up the sediments and clumps of shellfish, and that are spaced sufficiently to permit sediments and undersized shellfish to fall through, with any shellfish that make it up the platform being lifted into a conveyor by suction created in the lift pipe. Unlike the present invention, however, the arrangement disclosed in U.S. Pat. No. 3,624,932 requires a separate transport system powered by upwardly directed jets of air rather than water.

(iv) British Patent Publication No. 1,156,547

The closest prior art is disclosed in British Patent Publication No. 1,156,547. In the arrangement disclosed in this publication, dredging is carried out by directing pressurized water rearwardly relative to the direction of travel of the dredging apparatus so that the water jet sweeps sediments and shellfish towards a separator device and suction chamber. The suction chamber is connected to a trunk line through which shellfish that have been separated from the sediments are transported to the surface. The present invention also utilizes a water jet, separator, and suction chamber, but makes two key improvements relative to the apparatus disclosed in the British publication.

In the dredging apparatus disclosed in the British publication, as illustrated in FIGS. 1–4 herein, a sled 1 is arranged to be towed by a vessel 2 and cables 3,4 across the seabed 5. The sled 1 includes a digging blade 6 inclined forwardly and downwardly in the towing direction so as to extend below the runners or supports 7 for the main body of the sled. Facing the digging blade 6 is a digging water jet 8 arranged to direct a jet of water supplied by a pressure hose 9 in the direction of arrow A towards the digging blade for the purpose of loosening sediments and sweeping the sediments and shellfish residing therein past the blade to a separating device 10. Separating device 10 is in the form of a grid of bars 11 spaced above the runners immediately to the rear of the digging blade, and is designed to permit undersized shellfish, sediments, and other relatively small debris to fall past the bars and return to the seabed while facilitating movement of properly sized shellfish into suction chamber 12. A separating water jet 13 is also connected to the pressure hose 9 for facilitating separation of the shellfish, with "fish tail" suction chamber 12 being situated immediately to the rear of the separating device 10. Trunk line 14 is coupled to the suction chamber 12 for conveying shellfish that have passed the separating device 10 to the vessel 2 by means of a water jet 15 connected to the pressure hose 9 and extending into the trunk line 14. Water jet 15 creates a negative water pressure to cause water to be sucked from the suction chamber 12 into the trunk line 14 towards the vessel 2. At the surface, a channel screen 16 is mounted outboard of the of the vessel 2 so that the discharge from the trunk line pours into the channel screen, permitting the water to pass through and leaving shellfish for collection.

A first problem with the above-described apparatus is that while the separating bars 11 effectively separate out loose sediments and undersized shellfish, neither the knife blade nor the separating bars are capable of removing larger objects such as clumps of shellfish and debris from the stream of entrained shellfish before the larger objects are deposited in the suction chamber 13. As a result, it is possible for the suction chamber to become blocked, resulting in damage to the apparatus or, at best, costly delays while the apparatus is brought to the surface and unclogged.

A second problem with the apparatus described in the British publication and illustrated in FIGS. 1–4 is that the "fish tail" suction arrangement requires relatively large hydraulic pressure in order to create enough suction to transport shellfish to the surface, making the apparatus impractical for use on many fishing vessels or trawlers.

In addition, even if the suction chamber or trunk line of the apparatus shown in the British publication and in FIGS. 1–4 does not become clogged by debris that has made it passed the separating device, the presence of such extraneous material further increases the amount of pressure necessary to carry out the functions of digging, entrainment, and conveyance of the desired shellfish to the surface.

As a result of these problems, a need still exists for a dredging apparatus capable of extracting and continuously transporting shellfish to the surface, as in the British publication, and yet which more effectively separates out both larger and smaller debris before the debris enters the suction chamber, and which reduces power requirements for the water jet.

SUMMARY OF THE INVENTION

It is accordingly a first objective of the invention to provide a relatively low cost, high performance arrangement for harvesting shellfish from the bottom of a body of water and continuously conveying the harvested shellfish to a boat.

It is a second objective of the invention to provide an arrangement for harvesting shellfish from the bottom of a body of water in which conveyance of harvested shellfish to the surface is carried out by hydraulic action, and yet in which the amount of debris conveyed along with the shellfish is minimized to maximize efficiency and prevent clogging of the suction chamber and trunk line that carries the shellfish to the surface.

It is a third objective of the invention to provide a shellfish dredging apparatus that utilizes a more efficient means of hydraulically transporting shellfish harvested by a dredging device to the surface, without the need for separate pneumatic lines or additional pumps.

These objectives are achieved, in accordance with the principles of a preferred embodiment of the invention, by providing an apparatus for dredging shellfish that includes a digging jet connected to a source of pressurized water. The digging jet is arranged to liquify sediment and direct the sediment and any shellfish in the sediment past a digging blade and separating device positioned behind the digging blade. The separating device is arranged to separate sediments, undersized shellfish, and other debris from the shellfish to be harvested.

As in the prior art apparatus, a suction chamber collects the shellfish that have passed the separating device for conveyance to the surface. However, between the separating device and the suction chamber is a second separating device in the form of a plate having a plurality of openings for further separating shellfish from debris and clumps of sediment having a dimension larger than a maximum dimension of the shellfish to be collected or which is still clinging to the shellfish. Furthermore, instead of using a fish tail suction chamber, the shellfish are conveyed to the surface by a "Venturi tube."

A Venturi tube is defined as a short length of tubing with a tapering construction in the middle that causes an increase in the velocity of fluid flowing in the tubing and a corresponding decrease in fluid pressure so as to increase the suction force. In the preferred embodiment of the invention, the Venturi tube is directed to the pressurized water source in such a manner that water from the pressurized water source is directed into the tube away from the suction chamber so as to siphon water from the suction chamber in the direction of the surface, the efficiency of the siphon being significantly increased by the Venturi effect.

Thus, unlike the apparatus described in British Patent Publication 1,156,547, the apparatus of the present invention utilizes a Venturi tube and two separating devices, one of which is arranged to separate objects smaller than the shellfish to be collected and one of which is arranged to separate objects larger than the shellfish to be collected in order to minimize the chance of clogging the conveyance system, and maximize efficiency.

BRIEF DESCRIPTION OF THE DRAWINGS

FIG. 3 is a plan view of the dredging apparatus of FIGS. 1 and 2.

FIG. 4 is a cross-sectional view taken along line IV—IV of FIG. 3.

DETAILED DESCRIPTION OF THE PREFERRED EMBODIMENT

Figure 1:
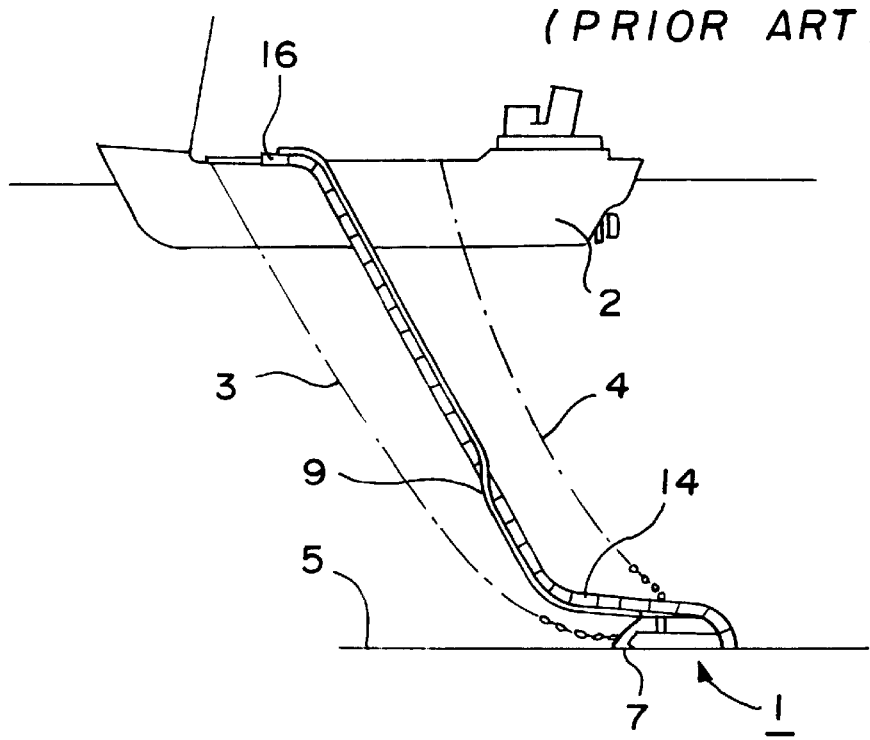
FIG. 1 is a schematic view of a ship towing a prior art dredging apparatus.
Figure 2:
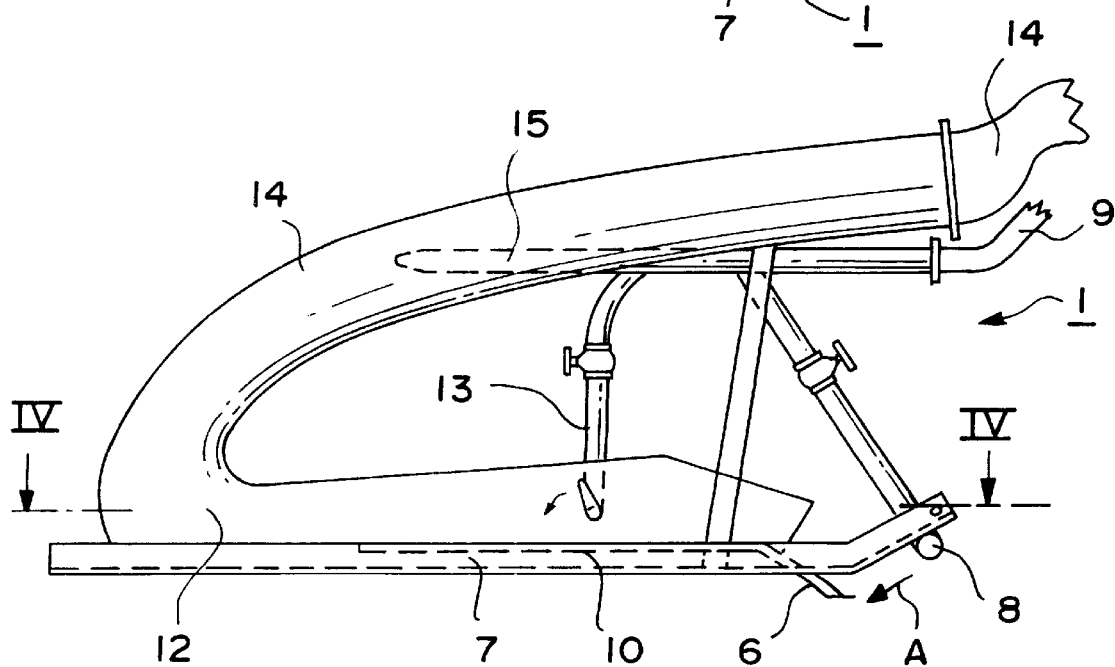
FIG. 2 is a side view of the dredging apparatus schematically illustrated in FIG. 1.
Figure 5:
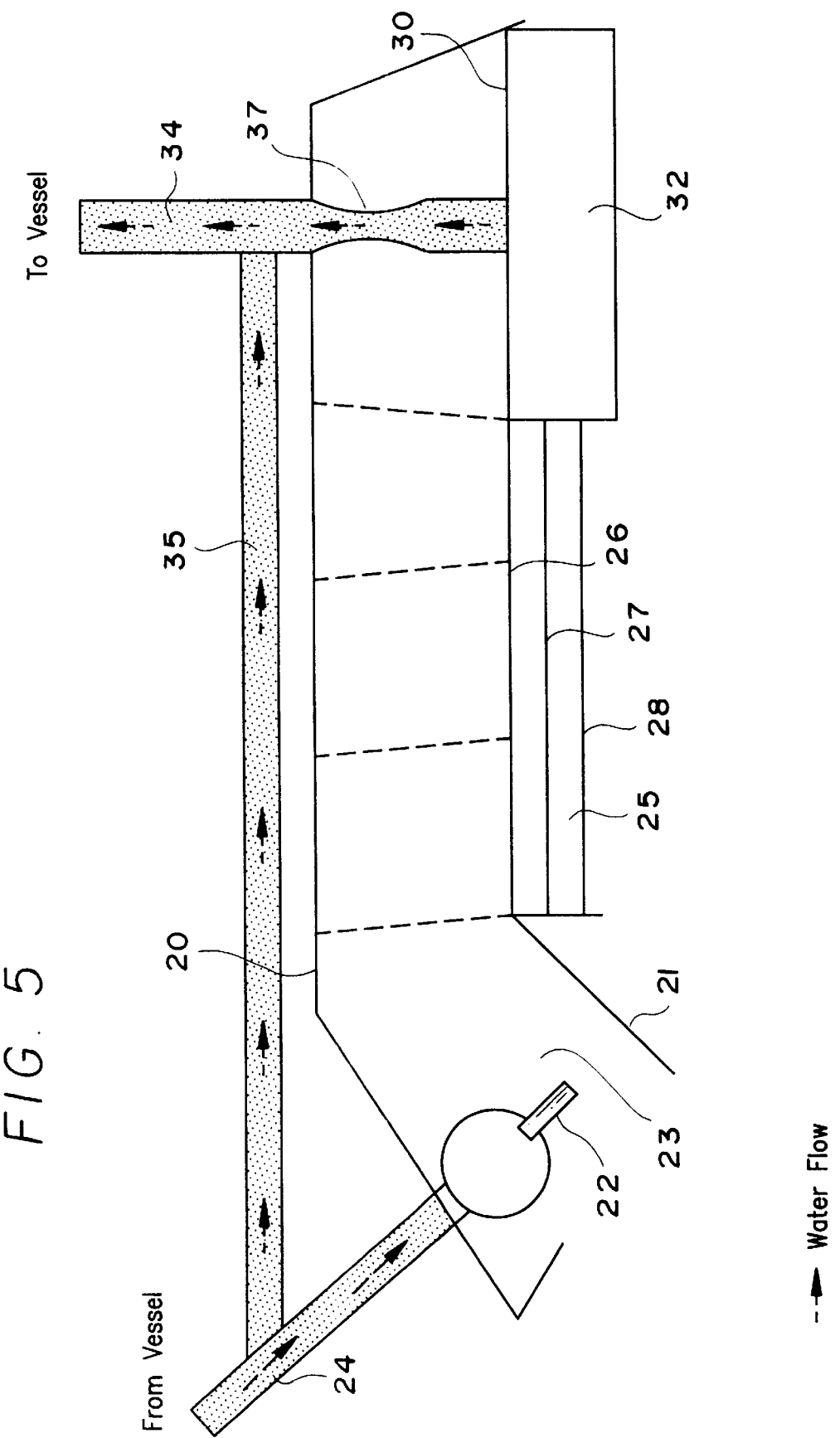
FIG. 5 is a schematic side view of a dredging apparatus constructed in accordance with the principles of a preferred embodiment of the invention.
Figure 6:
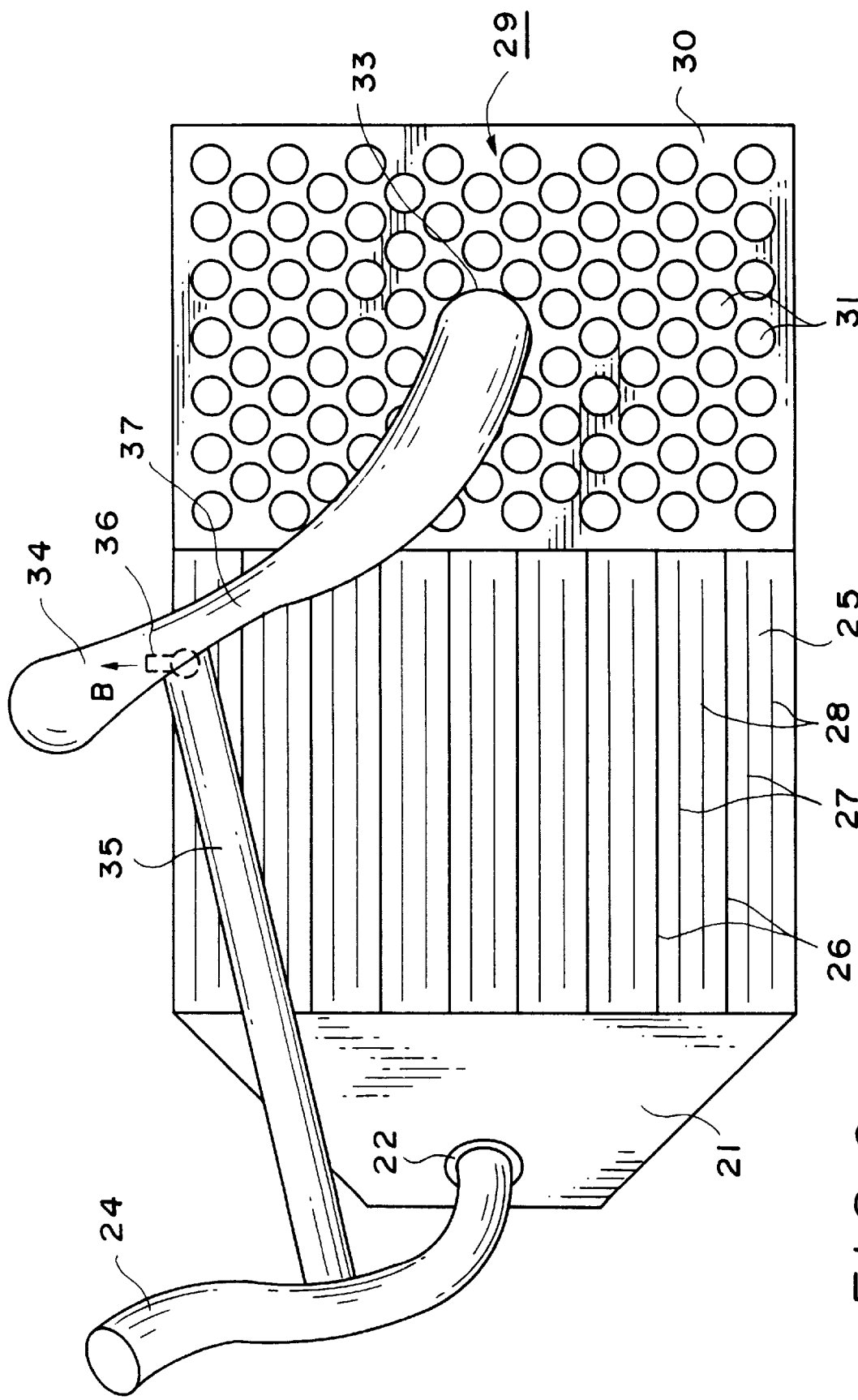
FIG. 6 is a schematic plan view of the dredging apparatus of FIG. 5.
Figure 7:
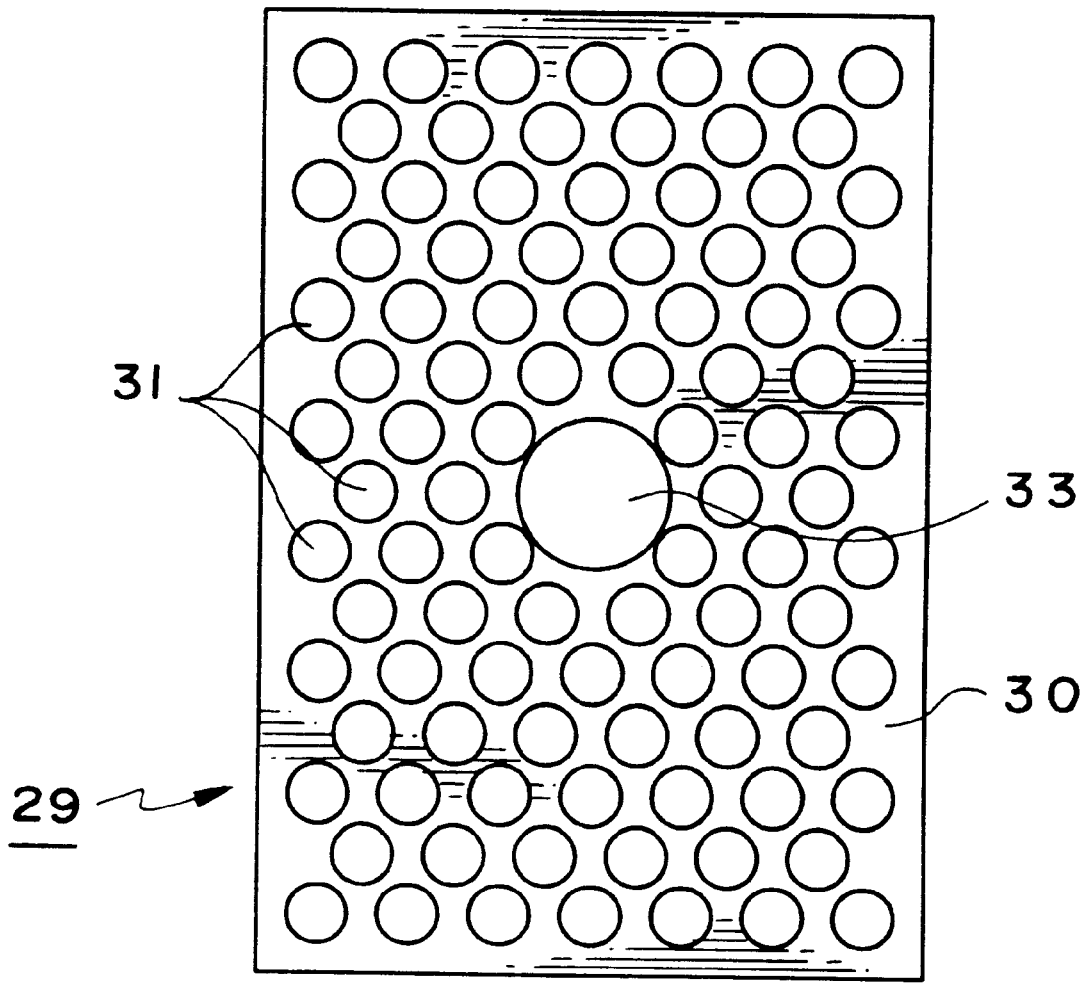
FIG. 7 is a plan view of a separating plate for use in the dredging apparatus of FIGS. 4 and 5.

As illustrated in FIGS. 5–7, the dredging apparatus of the preferred embodiment of the invention includes a sled including a casing or frame 20, a digging blade 21 that is inclined forwardly and downwardly relative to the main frame 20 of the sled so as to extend below the bottom of the frame into the sediments to be dredged. The sled may be supported by runners (not shown) in a manner similar to that illustrated in British Patent Publication No. 1,156,547, herein incorporated by reference, or other features designed to facilitate towing of the sled across the seabed, and may be of any construction suitable for supporting the elements described below in the appropriate marine environment.

A digging jet pipe 22 is fixed relative to the front surface of the digging blade 21 and is arranged to discharge water under pressure on to the surface of the seabed immediately ahead of the digging blade to fluidize the sediments as they pass onto the blade. The angle of the digging blade 21 is such that a surface section of the seabed cut by the blade travels up the slope of the blade and into the open end or mouth 23 of the frame 20. Water to the digging jet 22 is supplied by a pump situated on a vessel (not shown) through a hose 24 connected by suitable fittings to the digging jet in a manner similar to that disclosed in the afore-mentioned British publication.

Extending rearwardly from digging blade 21 is a first separating device 25 made up of a plurality of horizontal bars 26,27,28 arranged in a direction generally parallel to a direction of travel of the apparatus as it is towed by a vessel for separating shellfish collected by the digging blade from sediments in which the shellfish are entrained, and also for separating out immature shellfish having a size smaller than that of the shellfish to be collected. Horizontal bars 26,27,28 may optionally be arranged in three or more staggered layers to provide a more efficient sorting effect and facilitate movement of appropriately sized shellfish past the separating device, although those skilled in the art will appreciate that the use of multiple staggered layers is not essential, and that the structure of the separating device may be varied without departing from the scope of the invention.

To the rear of the first separating device 25 is a second separating device 29 in the form of a plate 30 having a plurality of openings 31 arranged to permit passage of shellfish while excluding larger objects, including clumps of sediment not completely liquified by the digging water jet. Plate 30 forms the top of a suction chamber 32 at the rear of the sled.

Plate 30 includes an opening 33 having a larger diameter than any of openings 31. Opening 33 is provided with a fitting (not shown) for attachment of a suction tube 34 extending to the towing vessel. Suction tube 34 is connected by a hose or pipe 35 to the hose 24 that also supplies water to the digging jet. One or more nozzles or other water directing devices 36 serve to direct pressurized water from hose or pipe 35 towards the surface in the direction of conveyance to create a suction effect and thereby siphon water in the direction of arrow B from the suction chamber with sufficient velocity to draw shellfish present in the suction chamber into the conveyance tube for conveyance to the towing vessel.

In order to increase the suction force, suction tube 34 includes a reduced diameter portion 37 adjacent or immediately below the nozzle(s) 36 for increasing the velocity of water being drawn past the nozzle so as to decrease the pressure in tube 34 in the area above suction chamber 32 and thereby increase the suction force and the efficiency by which shellfish in the suction chamber are transported to the surface.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention.

For example, while it is preferred that a common source of pressurized water be provided for both the digging jet and the siphon nozzle, the principle of utilizing two separating devices can be extended to apparatus in which a separate water source, or even a pneumatic or combination pneumatic and hydraulic source, is provided for digging and siphoning.

In addition, although a third water jet located above the separating device for facilitating passage of shellfish through the separating device 25 is not required, it is possible to include such an additional water jet or more than one jet anywhere along the path of the shellfish, and further to include additional pumps or Venturi devices anywhere in the water jet supply line or in the trunk line that transports shellfish to the surface.

Still further, while the preferred embodiment of the invention is directed to apparatus for extracting shellfish such as clams that dwell in mud or silt, the principles of the invention are also applicable to harvesting of shellfish that reside on the surface of the seabed.

Consequently, it is intended that the invention not be limited by the above description or accompanying drawings, but that it be defined solely in accordance with the appended claims.

I claim:

1. Apparatus for dredging shellfish from the bottom of a body of water, said apparatus being arranged to be towed by a vessel on the surface of the body of the water, comprising:
   a sled arranged to be towed by said vessel along said bottom;
   a pressurized water source arranged to direct a jet of water at sediments containing shellfish and cause said sediments and shellfish to be swept into said sled;
   a first separating device arranged to separate said shellfish from said sediments and from objects having a dimension smaller than a desired minimum dimension of said shellfish;
   a second separating device located behind the first separating device in a direction of water flow and arranged to separate said shellfish from objects having a dimension larger than a desired maximum dimension of said shellfish;
   a collection chamber arranged to receive shellfish that have been separated by said first and second separating devices; and
   a suction tube arranged to convey water from said collection chamber to said vessel and thereby convey said shellfish from the collection chamber to the vessel.

2. Apparatus as claimed in claim 1, further comprising a digging blade extending forwardly and downwardly from said sled relative to a direction of travel of said apparatus as it is towed by said vessel, said digging blade being arranged to separate layers of sediment that have been loosened by said jet of water and convey said loosened layers of sediment into said sled to said first separating device.

3. Apparatus as claimed in claim 1, wherein said first separating device comprises a plurality of bars extending parallel to said direction of travel of said apparatus.

4. Apparatus as claimed in claim 3, wherein said plurality of bars are arranged in three parallel planes and staggered.

5. Apparatus as claimed in claim 3, wherein said second separating device comprises a plate extending rearwardly from said first separating device, said plate forming a top of said collection chamber and including a plurality of openings through which said shellfish enter said collection chamber.

6. Apparatus as claimed in claim 1, wherein said second separating device comprises a plate extending rearwardly from said first separating device, said plate forming a top of said collection chamber and including a plurality of openings through which said shellfish enter said collection chamber.

7. Apparatus as claimed in claim 6, wherein said suction tube extends through a suction opening in said plate and includes at least one nozzle arranged to direct water away from said suction opening in order to cause water to siphon from said collection chamber through said opening and up to said vessel.

8. Apparatus as claimed in claim 7, wherein said at least one nozzle in said suction tube is connected to said source of pressurized water.

9. Apparatus as claimed in claim 7, wherein said suction tube includes at least one nozzle arranged to direct water away from said suction opening in order to cause water to siphon from said collection chamber through said opening and up to said vessel.

10. Apparatus as claimed in claim 9, wherein said at least one nozzle in said suction tube is connected to said source of pressurized water.

11. Apparatus for dredging shellfish from the bottom of a body of water, said apparatus being arranged to be towed by a vessel on the surface of the body of the water, comprising:

a sled arranged to be towed by said vessel along said bottom;

a pressurized water source arranged to direct a jet of water at sediments containing shellfish and cause said sediments and the shellfish to be swept into said sled;

a separating device arranged to separate said shellfish from said sediments;

a collection chamber arranged to receive shellfish that have been separated by said separating device;

a plate extending rearwardly from said separating device, said plate forming a top of said collection chamber and including a plurality of entry openings through which said shellfish enter said collection chamber, said plate further including a suction opening; and a suction tube extending through said suction opening and arranged to convey water from said collection chamber to said vessel and thereby convey said shellfish from the collection chamber to the vessel, wherein said suction tube includes at least one nozzle arranged to direct water away from said suction opening in order to cause water to siphon from said collection chamber through said opening and up to said vessel.

12. Apparatus as claimed in claim 11, further comprising a digging blade extending forwardly and downwardly from said sled relative to a direction of travel of said apparatus as it is towed by said vessel, said digging blade being arranged to separate layers of sediment that have been loosened by said jet of water and convey said loosened layers of sediment into said sled to said separating device.

13. Apparatus as claimed in claim 11, wherein said separating device comprises a plurality of bars extending parallel to said direction of travel of said apparatus.

14. Apparatus as claimed in claim 13, wherein said plurality of bars are arranged in three parallel planes and staggered.

15. Apparatus as claimed in claim 11, wherein said at least one nozzle in said suction tube is connected to said source of pressurized water.

* * * * *